(12) United States Patent
Mori et al.

(10) Patent No.: US 11,463,004 B2
(45) Date of Patent: Oct. 4, 2022

(54) BOOST CONVERTER CONTROL METHOD AND CONTROL APPARATUS

(71) Applicant: NISSAN MOTOR CO., LTD., Yokohama (JP)

(72) Inventors: Kenichi Mori, Kanagawa (JP); Toshio Ouchi, Kanagawa (JP); Yoshihiro Kondo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 103 days.

(21) Appl. No.: 17/046,016

(22) PCT Filed: Apr. 10, 2018

(86) PCT No.: PCT/JP2018/015126
§ 371 (c)(1),
(2) Date: Oct. 8, 2020

(87) PCT Pub. No.: WO2019/198160
PCT Pub. Date: Oct. 17, 2019

(65) Prior Publication Data
US 2021/0036614 A1    Feb. 4, 2021

(51) Int. Cl.
*H02P 1/00* (2006.01)
*H02M 3/158* (2006.01)
*H02P 27/06* (2006.01)

(52) U.S. Cl.
CPC ............ *H02M 3/158* (2013.01); *H02P 27/06* (2013.01)

(58) Field of Classification Search
CPC ........ H02M 3/158; H02P 27/06; H02P 27/04; H02P 2201/09; H02P 6/10
See application file for complete search history.

(56) References Cited

U.S. PATENT DOCUMENTS

| 2007/0165432 A1 | 7/2007 | Okamura et al. |
| 2010/0131136 A1 | 5/2010 | Ichikawa |
| 2011/0006723 A1 | 1/2011 | Yamakawa et al. |

FOREIGN PATENT DOCUMENTS

| JP | 2004343918 A | * 12/2004 | |
| JP | 2005-051895 A | 2/2005 | |
| JP | 2008-306822 A | 12/2008 | |
| JP | 2009-225634 A | 10/2009 | |
| JP | 2010-213404 A | 9/2010 | |
| JP | 2010-268578 A | 11/2010 | |
| WO | WO-2019215891 A1 | * 11/2019 | ............ H02M 3/158 |

* cited by examiner

*Primary Examiner* — Karen Masih
(74) *Attorney, Agent, or Firm* — Foley & Lardner LLP

(57) ABSTRACT

A boost converter control method in one aspect of the present invention is the control method of the boost converter that boosts a voltage input from a power supply and supplies a boosted voltage to a load-side. The control method of the boost converter is securing an output electric power required according to an operation point of a motor connected to the load-side, calculating a lower limit voltage value at which the output voltage of the boost converter does not oscillate, setting a target output voltage of the boost converter to a value equal to or higher than the lower limit voltage, and controlling the boost converter so as to output a voltage according to the target output voltage.

10 Claims, 11 Drawing Sheets

BOOST CONVERTER CONTROL METHOD AND CONTROL APPARATUS

TECHNICAL FIELD

The present invention relates to a boost converter control method and a control apparatus.

BACKGROUND ART

JP 2009-225634A discloses a technique related to setting a target output voltage of an electric power converter (boost converter). In this boost converter, a motor is connected to a load-side. Then, the boost converter divides an operating region of the motor into a boost region and a non-boost region, and then the boost converter selects the target output voltage that reduces the loss due to the motor drive during boost and non-boost. By doing so, the boost converter improves the efficiency when driving the motor.

SUMMARY OF THE INVENTION

Here, in the case of that the motor is driven through the boost converter, when the motor operates in power running, there is a case where the boosted voltage oscillates due to the negative resistance characteristic associated with the constant power control of the inverter. Further, when the motor operates in a regenerative running, there is a case where the voltage after boosting oscillates due to a response delay of the electrical current flowing into the inverter with respect to the boosted voltage.

However, in the technique disclosed in JP 2009-225634A, the target output voltage of the boost converter is set in consideration of only the loss during the motor driving (the power running). Therefore, there is a problem that the output voltage of the boost converter oscillates due to different factors during the power running and the regenerative running.

An object of the present invention is to provide a technique for suppressing the output voltage of the boost converter from oscillating regardless of the operating state of the motor (the power running, the regenerative running).

A boost converter control method in one aspect of the present invention is the control method of the boost converter that boosts a voltage input from a power supply and supplies a boosted voltage to a load-side. The control method of the boost converter is securing an output electric power required according to an operation point of a motor connected to the load-side, calculating a lower limit voltage value at which the output voltage of the boost converter does not oscillate, setting a target output voltage of the boost converter to a value equal to or higher than the lower limit voltage, and controlling the boost converter so as to output a voltage according to the target output voltage.

Embodiments of the present invention will be described in detail below with the accompanying drawings.

DESCRIPTION OF EMBODIMENTS

One Embodiment

Figure 1:
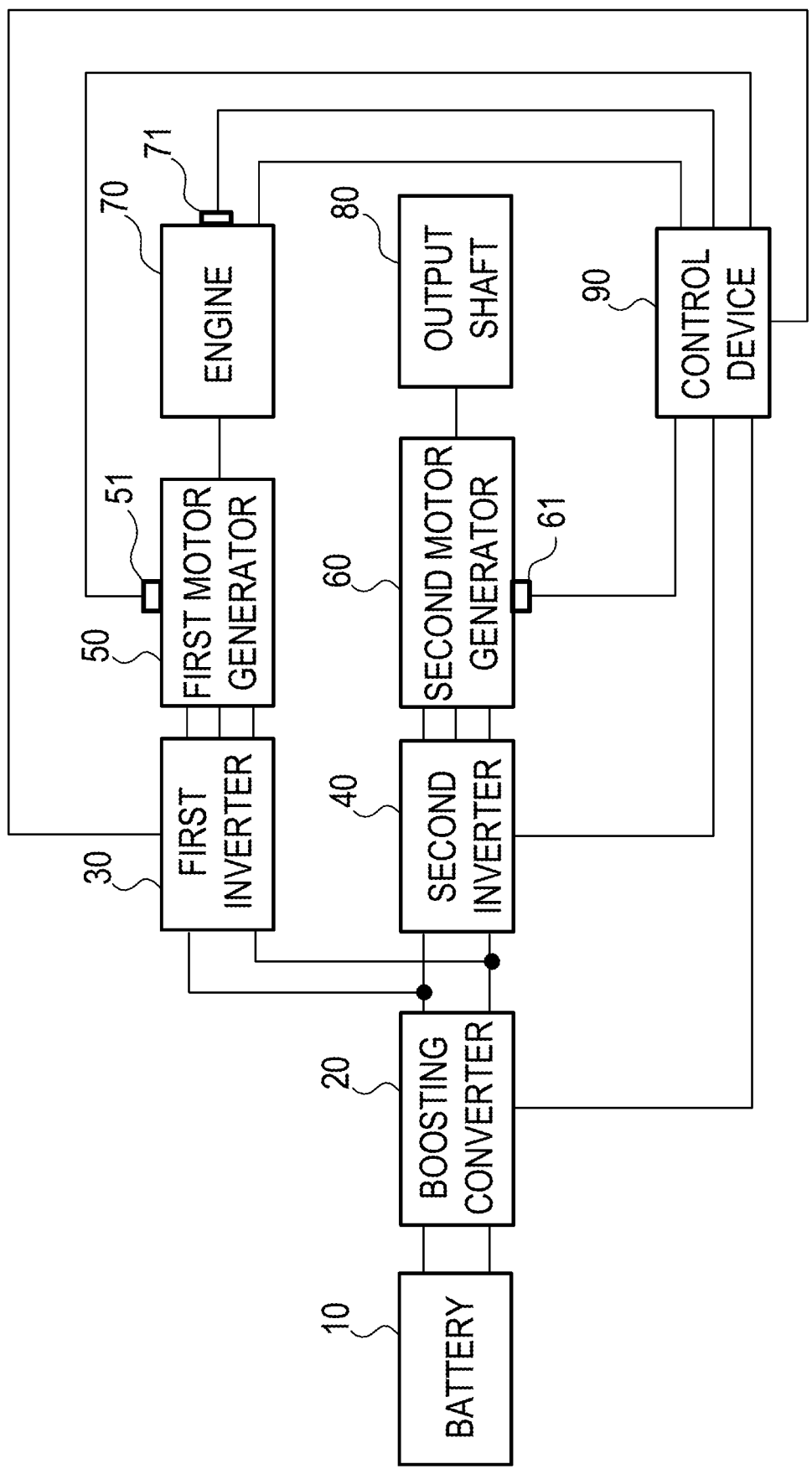
FIG. 1 is a system configuration diagram of a hybrid vehicle to which a control apparatus of a boost converter according to the present invention is applied.

FIG. 1 is a system configuration diagram of a hybrid vehicle to which a control apparatus of a boost converter according to the present invention is applied. FIG. 1 shows a configuration example in which the control apparatus of the boost converter is applied to a hybrid vehicle equipped with two motor generators. As shown in the figure, the hybrid vehicle of the present embodiment includes a battery 10, a boost converter 20, a first inverter 30, a second inverter 40, a first motor generator 50, a second motor generator 60, an engine 70, a rotation speed detector 51, 61, 71, an output shaft 80, and a control device 90.

Figure 2:
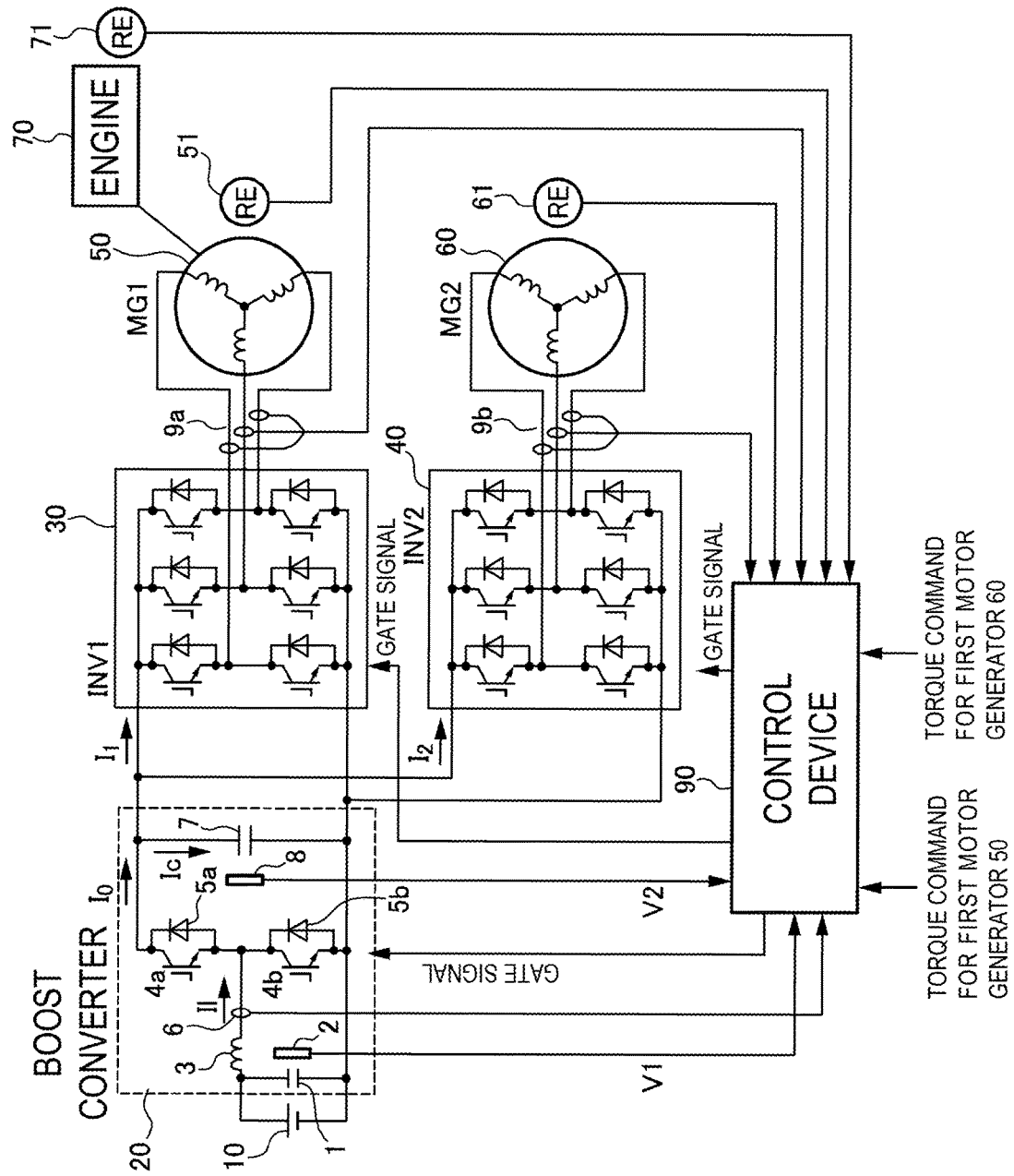
FIG. 2 is a system configuration diagram describing each configuration shown in FIG. 1 in more detail.

FIG. 2 is a system configuration diagram describing each configuration shown in FIG. 1 in more detail. Details of each configuration will be described with reference to FIG. 2.

The battery 10 is a chargeable/dischargeable secondary battery, for example, a lithium ion secondary battery.

The boost converter 20 is an electric power conversion device that boosts an inputted voltage and outputs it. In the boost converter 20 of the present embodiment, the battery 10 as a power supply is connected to the primary side (input-side), and the first inverter 30 and the second inverter 40 are connected in parallel to the secondary side (output-side, load-side). Details of the configuration of the boost converter 20 will be described with reference to FIG. 3.

Figure 3:
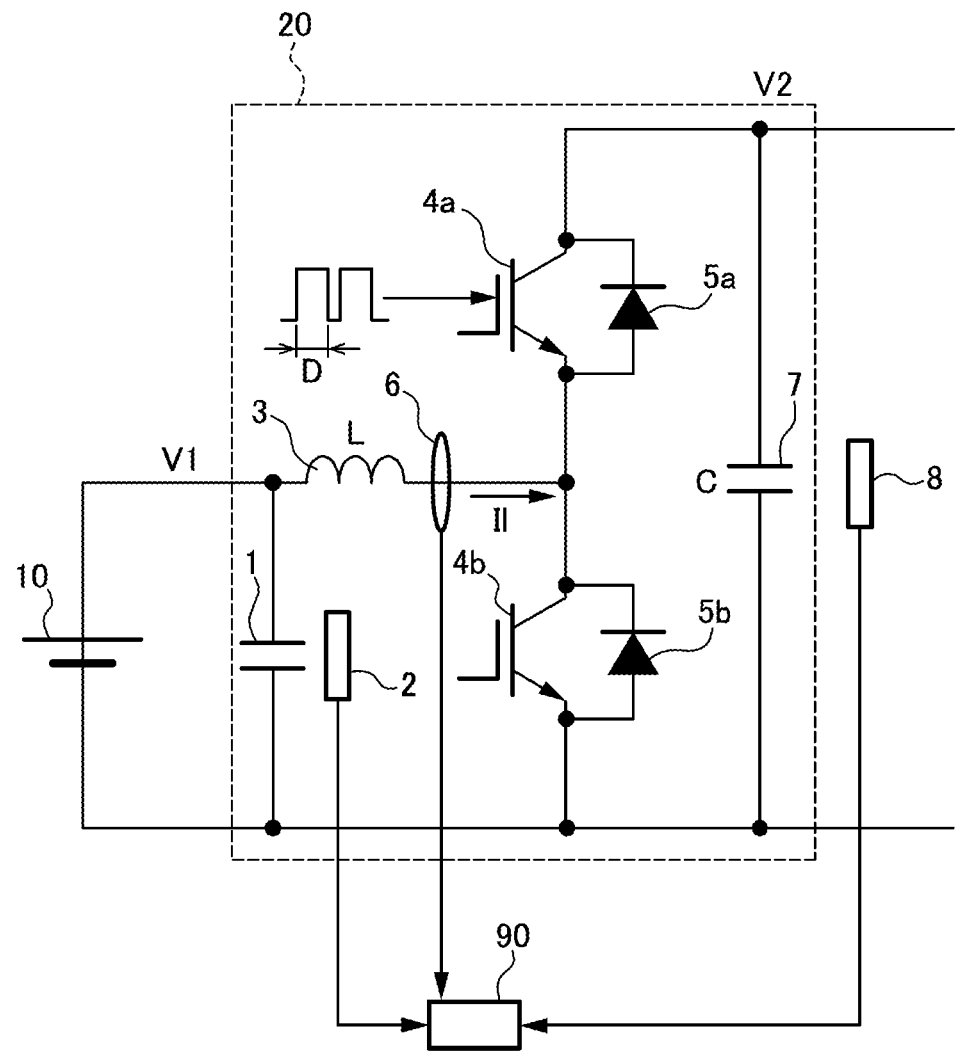
FIG. 3 is a circuit configuration diagram for explaining a circuit configuration of a boost converter.

FIG. 3 is a circuit configuration diagram for explaining a circuit configuration of a boost converter 20. The boost converter 20 mainly includes a capacitor 1, a reactor (inductance) 3, and switching elements 4a and 4b. The boost converter 20 boosts the input voltage V1 of the direct current input from the battery 10, and outputs the output voltage V2 after boosted.

The capacitor 1 rectifies the input voltage V1 by absorbing the pulsating flow (voltage ripple) generated in the input voltage V1 due to the switching of the switching elements 4a and 4b.

The voltage sensor 2 is attached in the capacitor 1, detects the input voltage V1 of the boost converter 20, that is, the voltage of the capacitor 1, and sends the detected voltage value to the control device 90.

The reactor 3 accumulates electric energy from the battery 10 when the switching element 4a is turned ON and the switching element 4b is turned OFF, and discharges the accumulated electric energy when the switching element 4a is turned OFF and the switching element 4b is turned ON.

As a result, the boost converter 20 can boost the DC voltage from the battery 10. The voltage value after boosted (voltage value of the output voltage V2) can be arbitrarily adjusted by changing the ratio (duty ratio D) of the period in which the switching element 4a is turned ON. The reactor 3 also has a function of suppressing the voltage ripple generated due to the switching of the switching elements 4a and 4b.

The switching elements 4a and 4b are composed of power semiconductor elements such as IGBT and MOS-FET. Further, diodes 5a and 5b are connected in parallel to the switching elements 4a and 4b, respectively.

The current sensor 6 detects the electrical current through the reactor 3 and sends the detected current value to the control device 90. In other words, the current sensor 6 can detect the direct electrical current flowing out of the battery 10 or flowing into the battery 10, through the boost converter 20.

The capacitor 7 rectifies the output voltage V2 by absorbing the pulsating flow (voltage ripple) generated in the output voltage V2 due to the switching of the switching elements 4a and 4b.

The voltage sensor 8 is attached in the capacitor 7, detects the output voltage V2 of the boost converter 20, that is, the voltage of the capacitor 7, and sends the detected voltage value to the control device 90. Hereinafter, returning to FIG. 2, the description will be continued.

The first inverter 30 and the second inverter 40 are three-phase inverters that can output three-phase AC power.

The first inverter 30 converts DC power (the output voltage V2) input from the boost converter 20 into the three-phase first AC power, and supplies it to the first motor generator 50. Further, the first inverter 30 converts the three-phase AC power generated by the first motor generator 50 into DC power and charges the battery 10 thorough the boost converter 20, or supplies the DC power to the second inverter 40.

The second inverter 40 converts the DC power input from the boost converter 20 into the three-phase second AC power, and supplies it to the second motor generator 60. Further, the second inverter 40 converts the three-phase second AC power (the regenerative electric power) generated by the second motor generator 60 into DC power, and charges the battery 10 through the boost converter 20.

The current sensor 9a is attached to the electric power line connecting the first inverter 30 and the first motor generator 50, detects the electrical current through the electric power line, and sends the detected current value to the control device 90. Further, the current sensor 9b is attached to the electric power line connecting the second inverter 40 and the second motor generator 60, detects the electrical current through the electric power line, and sends the detected current value to the control device 90. The current sensors 9a and 9b of the present embodiment detect the electrical current flowing from the inverter to the motor generator side, that is, the electrical current in the power running as a positive value. The current sensors 9a and 9b detect the electrical current flowing from the motor generator to the inverter side, that is, the electrical current in the regenerative running as a negative value.

In this specification, when simply described as "inverter", at least one of the first inverter 30 and the second inverter 40 is indicated. Further, in the present specification, when simply described as a motor generator or a motor, at least one of the first motor generator 50 and the second motor generator 60 is indicated.

The first motor generator 50 of this embodiment is, for example, an electric power generator. The first motor generator 50 rotates by the driving force from the engine 70 to generate electric power. Further, at the time of starting the engine 70, the first motor generator 50 performs cranking the engine 70 using the driving force from the first motor generator 50, and also performs motoring for consuming electric power by rotating the engine 70 by power running using the driving force of the first motor generator 50.

The second motor generator 60 of this embodiment is, for example, a drive motor that functions as a drive source for the vehicle. The second motor generator 60 generates a driving force by the AC power supplied from the second inverter 40 and transmits the driving force to the output shaft 80. Further, the second motor generator 60 recovers the kinetic energy of the vehicle as electric energy by generating regenerative driving force when being driven by the driving wheels and rotated such as during deceleration or during coast running.

That is, the control apparatus of the boost converter 20 according to the present embodiment is applied to a so-called series type hybrid vehicle equipped with a first motor generator 50 (an electric power generator) for power generation and a second motor generator 60 (a drive motor) for driving.

The engine 70 is connected to the rotating shaft of the first motor generator 50 through a gear not shown in FIGs, and transmits the driving force for the first motor generator 50 to generate electric power, to the first motor generator 50. In addition, the vehicle to which the control apparatus of the boost converter 20 of the present embodiment is applied is the series type. Therefore, in principle, the engine 70 in this embodiment is used only as a drive source for rotationally driving the first motor generator 50. However, a known torque transmission device may be arranged between the engine 70 and the output shaft 80 in order to transmit the output torque of the engine 70 to the output shaft 80.

The rotation speed detectors 51, 61, 71 are, for example, resolvers. The rotation speed detectors 51 and 61 are attached to the first motor generator 50 and the second motor generator 60, respectively, and detect the rotation angle or the rotation speed of the each rotors included in the first motor generator 50 and the second motor generator 60, and output it to the control device 90. The rotation speed detector 71 is attached to the engine 70, detects a rotation angle or a rotation speed of a crankshaft included in the engine 70, and outputs it to the control device 90.

The control device 90 controls the driving of the boost converter 20, the first inverter 30, the second inverter 40, the first motor generator 50, the second motor generator 60, and the engine 70. The control device 90 is composed of one or a plurality of controllers. The controller is, for example, composed of a central processing unit (CPU), a read only memory (ROM), a random-access memory (RAM), and an input/output interface (I/O interface).

More specifically, the control device 90 creates a switching pattern according to the torque command for the first motor generator 50, the motor rotation speed of the first motor generator 50 (the detection value of the rotation speed detector 51), the input/output current value (the detection value of the current sensor 9a), and the input voltage (the detection value of the voltage sensor 8). Then, the control device 90 sends the switching pattern as a gate signal to the first inverter 30. Further, the control device 90 creates a switching pattern according to the torque command for the second motor generator 60, the motor rotation speed of the second motor generator 60 (the detection value of the rotation speed detector 61), the input/output current value (the detection value of the current sensor 9b), and the input voltage (the detection value of the voltage sensor 8). Then, the control device 90 sends the switching pattern as a gate signal to the second inverter 40. In addition, the torque command here, is a command value (a torque request value) for causing the motor to output a desired torque (a request torque), and is calculated, for example, based on the accelerator opening degree or the like.

Further, the control device 90 calculates the input voltage required for the first motor generator 50 according to the torque command for the first motor generator 50 and the motor rotation speed of the first motor generator 50. Further, the control device 90 calculates the input voltage required for the second motor generator 60 according to the torque command for the second motor generator 60 and the motor rotation speed of the second motor generator 60. Then, the control device 90 sets the voltage value determined based on each calculated input voltage as the target output voltage V2* of the boost converter 20. Then, the control device 90 creates a switching pattern (duty ratio D) for outputting the target output voltage V2* and sends the duty ratio D to the boost converter 20 as a gate signal.

Next, a method of setting the target output voltage V2* in this embodiment will be described with reference to FIG. 4.

Figure 4:
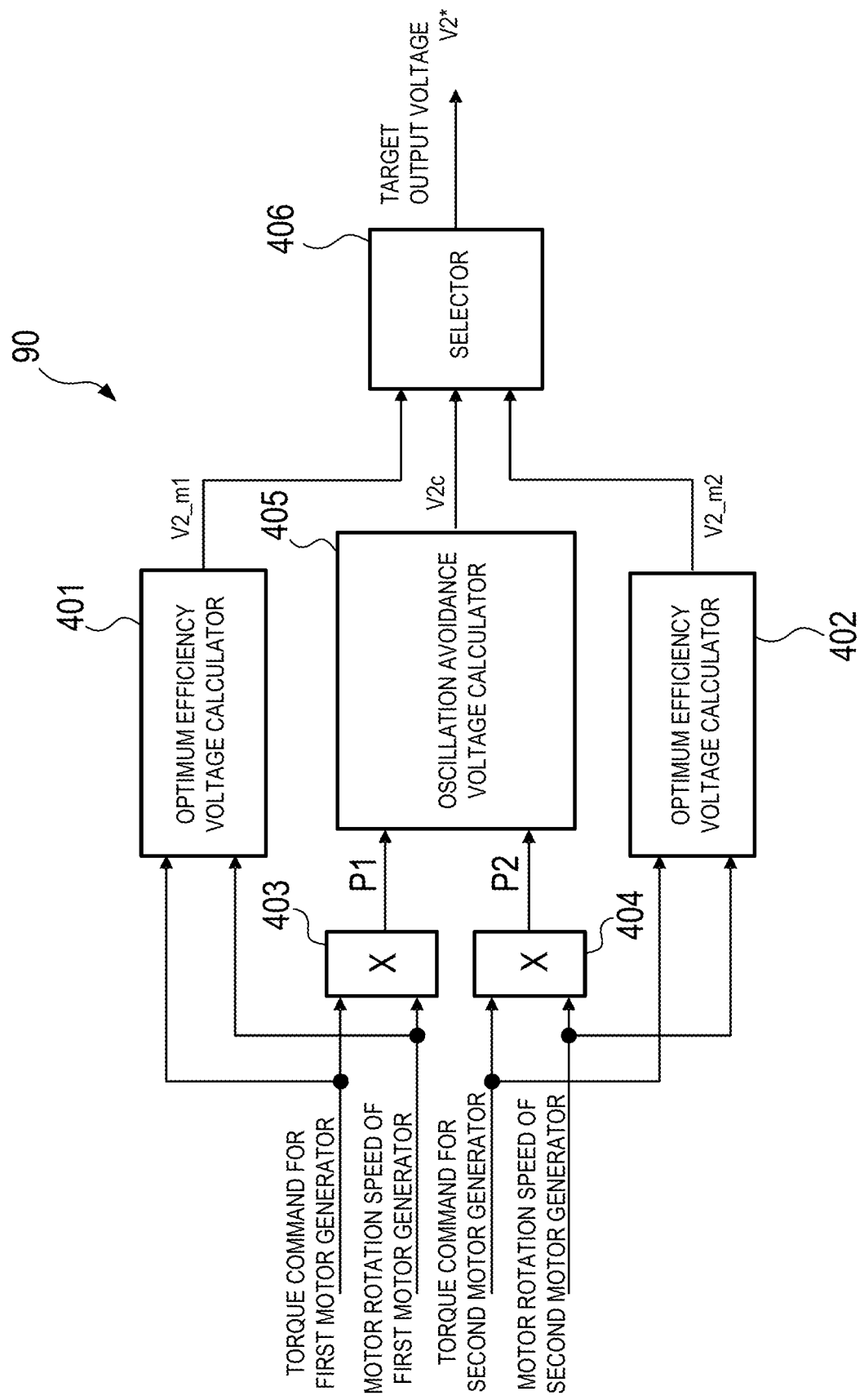
FIG. 4 is a block configuration diagram used in determining the target output voltage V2*.

FIG. 4 is a block configuration diagram when the control device 90 determines the target output voltage V2*. The control device 90 of the present embodiment determines the target output voltage V2* using the optimum efficiency voltage calculator 401 and 402, the multipliers 403 and 404, the oscillation avoidance voltage calculator 405, and the selector 406.

The optimum efficiency voltage calculator 401 outputs the optimum efficiency voltage obtained from the torque command for the first motor generator 50 and the motor rotation speed of the first motor generator 50 to the selector 406 as the first optimum efficiency voltage $V2_{-m1}$ for the first motor generator 50. Furthermore, the optimum efficiency voltage here is the voltage that is input to the first inverter 30 to secures the output electric power required according to the operation point of the first motor generator 50 and to output the desired torque to the first motor generator 50 most efficiently. Then, the optimum efficiency voltage is obtained by a known method based on the torque command or the like for the first motor generator 50.

The optimum efficiency voltage calculator 402 outputs the optimum efficiency voltage obtained from the torque command for the second motor generator 60 and the motor rotation speed of the second motor generator 60 to the selector 406 as the second optimum efficiency voltage $V2_{-m2}$ for the second motor generator 60. Furthermore, the optimum efficiency voltage here is the voltage that is input to the second inverter 40 to secures the output electric power required according to the operation point of the second motor generator 60 and to output the desired torque to the second motor generator 60 most efficiently. Then, the optimum efficiency voltage is obtained by a known method based on the torque command or the like for the second motor generator 60.

The multiplier 403 calculates the required output (the required electric power P1) to the first motor generator 50 by multiplying the torque command for the first motor generator 50 by the motor rotation speed of the first motor generator 50, and outputs it to the oscillation avoidance voltage calculator 405. In addition, the required electric power P1 has a positive value (P1>0) when the first motor generator 50 is performed power running, and the required electric power P1 has a negative value (P1<0) when the first motor generator 50 is performed regenerative running.

The multiplier 404 calculates the required output (the required electric power P2) to the second motor generator 60 by multiplying the torque command for the second motor generator 60 by the motor rotation speed of the second motor generator 60, and outputs it to the oscillation avoidance voltage calculator 405. In addition, the required electric power P2 has a positive value (P2>0) when the second motor generator 60 is performed power running, and the required electric power P2 has a negative value (P2<0) when the second motor generator 60 is performed regenerative running.

The oscillation avoidance voltage calculator 405 receives the required electric power P1 for the first motor generator 50 and the required electric power P2 for the second motor generator 60. Then, the oscillation avoidance voltage calculator 405 calculates a lower limit voltage $V_{2C}$ as a lower limit value that can avoid oscillating of the output voltage V2 when the value is higher than this, based on the required electric powers P1 and P2. In other words, the oscillation avoidance voltage calculator 405 calculates the lower limit voltage $V_{2C}$ of the output voltage V2 such that the output voltage V2 of the boost converter 20 does not oscillate, based on the required electric powers P1 and P2. The calculated lower limit voltage $V_{2C}$ is output to the selector 406. The details of the method of calculating the lower limit voltage $V_{2C}$ will be described later.

The selector 406 selects the largest value from the three input voltage values (select high) and outputs it. That is, the selector 406 determines the final target output voltage V2* of the boost converter 20 by selecting the highest voltage from the first optimum efficiency voltage $V2_{-m1}$, the second optimum efficiency voltage $V2_{-m2}$, and the lower limit voltage $V_{2C}$. Then, in a not shown control block, the control device 90 sends to the boost converter 20 a duty ratio D as a gate signal for the boost converter 20 to output the voltage corresponding to the target output voltage V2*. In addition, when the efficiency of the motor generator is not considered, the lower limit voltage $V_{2C}$ calculated in the oscillation avoidance voltage calculator 405 can be set as the target output voltage V2* without the optimum efficiency voltage calculator 401, 402 and the selector 406.

Here, the principle that output voltage V2 oscillates in boost converter 20 will be described.

As a general rule, the electric power assigned to boost converter 20 is a value obtained by adding required electric power P1 and required electric power P2 (the value is referred to as "required electric power P1+P2" below). When the required electric power P1+P2 is positive, the output voltage V2 oscillates mainly due to the negative resistance characteristic associated with the constant power control of at least one of the first inverter 30 and the second inverter 40. On the other hand, when the required electric power P1+P2 is negative, the output voltage V2 oscillates mainly due to the response delay when the electrical current flows to at least one of the first motor generator 50 and the second motor generator 60. That is, the main factor causing the output voltage V2 to oscillate depends on whether the electric power required for the boost converter 20 is positive or negative. In the following, when simply referred to as "inverter", "inverter" indicates at least one of the first inverter 30 and the second inverter 40, and when simply referred to as "motor generator", the "motor generator" indicates the first motor generator 50 and the second motor generator 60.

At first, the required electric power P1+P2 is positive, that is, when the electric power is taken out from boost converter 20 (when power running is performed), the condition for stable supply without oscillating output voltage V2 is explained.

The relationship between the output electric power V2 of the boost converter 20 and the output current ($I_1+I_2$) of the boost converter 20 is expressed by the following formula (1). Where, $V_{20}$ in the formula indicates the value of the output voltage V2 of the boost converter 20, $I_{10}$ indicates the value of the electrical current $I_1$ flowing through the first inverter 30, and $I_{20}$ indicates the value of the electrical current $I_2$ flowing through the second inverter 40. Further, $R_0$ in the formula indicates an impedance of the motor generator when the first inverter 30 and the second inverter 40 try to control the first motor generator 50 and the second motor generator 60 to constant power (required electric power P1+P2) when the output voltage V2 of the boost converter 20 is the voltage $V_{20}$. $I_{ofs}$ will be described later with reference to FIG. 5.

[Expression 1]

$$I_1 + I_2 = -\frac{V_2}{R_0} + I_{ofs} \quad \left(R_0 = \frac{V_{20}}{I_{10} + I_{20}}\right) \quad (1)$$

Figure 5:
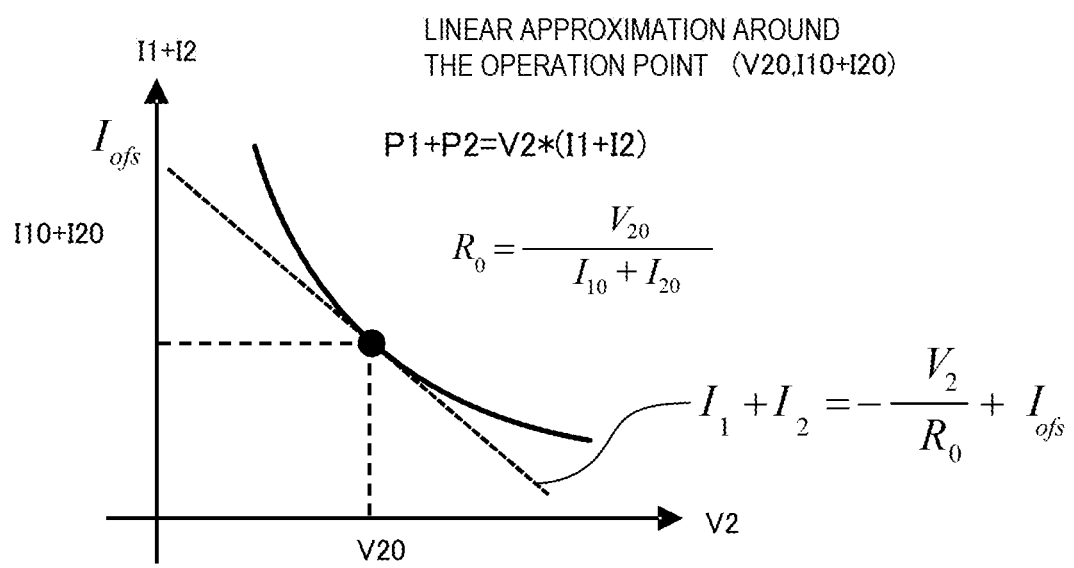
FIG. 5 is a diagram for explaining the linear approximation of a motor generator around an operation point.

FIG. 5 is a diagram for explaining the linear approximation around an operation point when the first inverter 30 and the second inverter 40 control the first motor generator 50 and the second motor generator 60 to a constant electric power, in order to derive the above formula (1). The horizontal axis indicates the output voltage V2 of the boost converter 20, and the vertical axis indicates the output current ($I_1+I_2$) of the boost converter 20. Further, a curve indicated by a thick line in the figure shows a constant electric power line when the first inverter 30 and the second inverter 40 control the first motor generator 50 and the second motor generator 60 at constant power. The operation points of the first motor generator 50 and the second motor generator 60 are set on the constant electric power line, where the horizontal axis at $V_{20}$ and the vertical axis at I10+I20.

As shown in the figure, the above formula (1) is derived by linear approximation around the operation point ($V_{20}$, $I_{10}+I_{20}$) (see the dotted line in the figure). Further, as indicated by the dotted line in the figure, $I_{ofs}$ in the formula (1) is expressed by an intercept of a straight-line when linearly approximated at the operation point ($V_{20}$, $I_{10}+I_{20}$). Further, R0, indicating the impedance of the motor generator, is set to a positive value when required electric power P1+P2 is positive and is set to a negative value when required electric power P1+P2 is negative. In the illustrated state, the transfer characteristic of the boost converter 20 from the input voltage V1 to the output voltage V2 is expressed by the following formula (2).

[Expression 2]

$$V_2 = \frac{\frac{1}{LC}}{s^2 + \left(\frac{R}{L} - \frac{1}{R_0 C}\right)s + \frac{1}{LC}\left(D^2 - \frac{R}{R_0}\right)}\{DV_1 - (Ls+R)I_{ofs}\} \quad (2)$$

Where, L in formula (2) indicates the inductance [H] of the reactor 3, C indicates the capacity [F] of the capacitor 7, and R indicates the circuit resistance [Ω] of the boost converter 20 when the switching element 4b is turned ON.

As described above, when the power (required electric power P1+P2) assigned to the boost converter 20 is positive, $R_0>0$ is set. Therefore, the condition of $R_0$ for stably supplying the output voltage V2 of the boost converter 20 is represented by the following formula (3) in consideration of the values of R, L, and C when actually designing the boost converter 20. Then, the condition represented by the following formula (5) can be obtained by rearranging the following formula (3) using the following formula (4) with the output voltage V2 and the required electric power P1+P2 of the boost converter 20.

[Expression 3]

$$R_0 > \frac{L}{RC} \quad (3)$$

[Expression 4]

$$R_0 = \frac{V_2}{I_1 + I_2} = \frac{V_2^2}{P_1 + P_2} \quad (4)$$

[Expression 5]

$$V_2 > \sqrt{\frac{L}{RC}(P_1 + P_2)} \quad (5)$$

The formula (5) defines the conditions for stable supply of output voltage V2 of boost converter 20. According to the formula (5), it can be seen that the output voltage V2 must be increased as the required electric power P1+P2 increases, in order not to oscillate the output voltage V2 of the boost converter 20 when the required electric power P1+P2 to the boost converter 20 is positive. In the present embodiment, the lower limit voltage $V2_C$ of the output voltage V2 of the boost converter 20 is set to satisfy the formula (5) in order not to oscillate the output voltage V2 of the boost converter 20.

In addition, actually, when the output voltage V2 of the boost converter 20 is applied to the input section (DC section) of the first inverter 30 and the second inverter 40, the response characteristics of the electrical current flowing in the first motor generator 50 and the second motor generator 60 are considered, then the transfer characteristics from the input voltage V1 to the output voltage V2 are obtained, and the lower limit voltage $V2_C$ is calculated. More specifically, when the output voltage V2 of the boost converter 20 is applied to the first motor generator 50, the lower limit voltage $V2_C$ may be calculated in consideration of at least one of the response characteristics of the electrical current, one of the response characteristics of the electrical current is the response characteristic of the electrical current I1 flows to the first motor generator 50 according to the required electric power P1, when the output voltage V2 of the boost converter 20 is applied to the second motor generator 50. And the other of the response characteristic of the electrical current is the response characteristic of the electrical current I2 flows to the second motor generator 60 according to the required electric power P2, when the output voltage V2 of the boost converter 20 is applied to the second motor generator 60. As a result, the lower limit voltage $V2_C$ at which the output voltage V2 does not oscillate can be calculated more accurately.

However, the value of the lower limit voltage $V2_C$ shown on the right side of the formula (5) is calculated without considering the response characteristic of the electrical current described above, and is therefore a value calculated under the most severe conditions. For this reason, the value of the lower limit voltage $V2_C$ shown on the right side of the formula (5) is a value larger than that when calculated in consideration of the response characteristic of the electrical current. Therefore, in the case where the suppression of oscillation is the main purpose, it is not always necessary to consider the response characteristic of the electrical current described above when calculating the lower limit voltage $V2_C$. By setting the lower limit voltage $V2_C$ so as to satisfy the formula (5), it is possible to reliably prevent the output voltage V2 of the boost converter 20 from oscillating.

Next, when required electric power P1+P2 is negative, that is, when the regenerative running in which power is supplied to boost converter 20 is performed, conditions for stable supply of output voltage V2 without oscillating will be described.

In the following, as an example, a case where the second motor generator 60 is regenerative running while the boost converter 20 is stopped will be described. In this case, when the transfer characteristic from the input voltage V1 to the output voltage V2 of the boost converter 20 is calculated, it is expressed by the following formula (7). In the following formula (7), the response characteristic of the electrical current is considered when the electrical current I2 flows to the second motor generator 60 according to the required electric power P2 when the output voltage V2 of the boost converter 20 is applied to the input section (DC section). This current response characteristic is represented by the second-order delay system of the following formula (6). $\zeta 2$ in the formula (6) indicates the damping coefficient of the second-order delay system. $\omega 2$ indicates the natural frequency when the natural oscillation frequency of the second-order delay system is f2, and is a value determined by the operation point of the second motor generator 60. Furthermore, since the required electric power P1+P2 is negative, P0<0 is set.

[Expression 6]

$$\frac{(2\pi f_2)^2}{s^2 + (2 \times \zeta_2 \times 2\pi f_2)s + (2\pi f_2)^2} \quad (6)$$

[Expression 7]

$$V_2 = \frac{R_0(s^2 + 2\zeta_2\omega_2 s + \omega_2^2)DV_1 - R_0(Ls + R)\omega_2^2 I_{ofs}}{R_0 LCs^4 + R_0 C(2\zeta_2\omega_2 L + R)s^3 +} \\ R_0(LC\omega_2^2 + 2\zeta_2\omega_2 RC + D^2)s^2 + \\ \omega_2\{R_0(CR\omega_2 + 2\zeta_2 D^2) - L\omega_2\}s + \omega_2^2(D^2 R_0 - R)} \quad (7)$$

Then, based on the formula (7), the condition of $R_0$ is found so that the transfer characteristic of the boost converter 20 from the input voltage V1 to the output voltage V2 is stable. Specifically, the condition of $R_0$ is found such that the real part of the solution of the characteristic equation of the denominator polynomial of the formula (7)=0 is negative. The conditions for the output voltage V2 are calculated by arranging the obtained conditions for $R_0$ with the output voltage V2 of the boost converter and the required electric power P1+P2, by using the above formula (4). Then, by setting the output voltage V2 of the boost converter 20 to the lower limit voltage $V2_C$ or more so as to satisfy the condition, it is possible to suppress the output voltage V2 from oscillating.

In addition to the above, there are other conditions that make it easier for the output voltage V2 to oscillate. For example, when the resonance frequency of the boost converter 20 and the oscillation frequency of the motor generator (at least one of the first motor generator 50 and the second motor generator 60) are close to each other, regardless of whether the required electric power P1+P2 is positive or negative, the output voltage V2 of the boost converter 20 becomes easier to oscillate by interference between them. Therefore, in the present embodiment, the lower limit voltage $V2_C$ of the output voltage V2 is set to be higher as the resonance frequency of the boost converter 20 is closer to the oscillation frequency of the motor generator. As a result, since the output voltage of the boost converter 20 is increased and the stability can be improved, the oscillation of the output voltage V2 can be further suppressed.

Next, a method of setting the target output voltage V2* of the boost converter 20 in this embodiment will be described with reference to FIG. 6 to FIG. 10.

Figure 6:
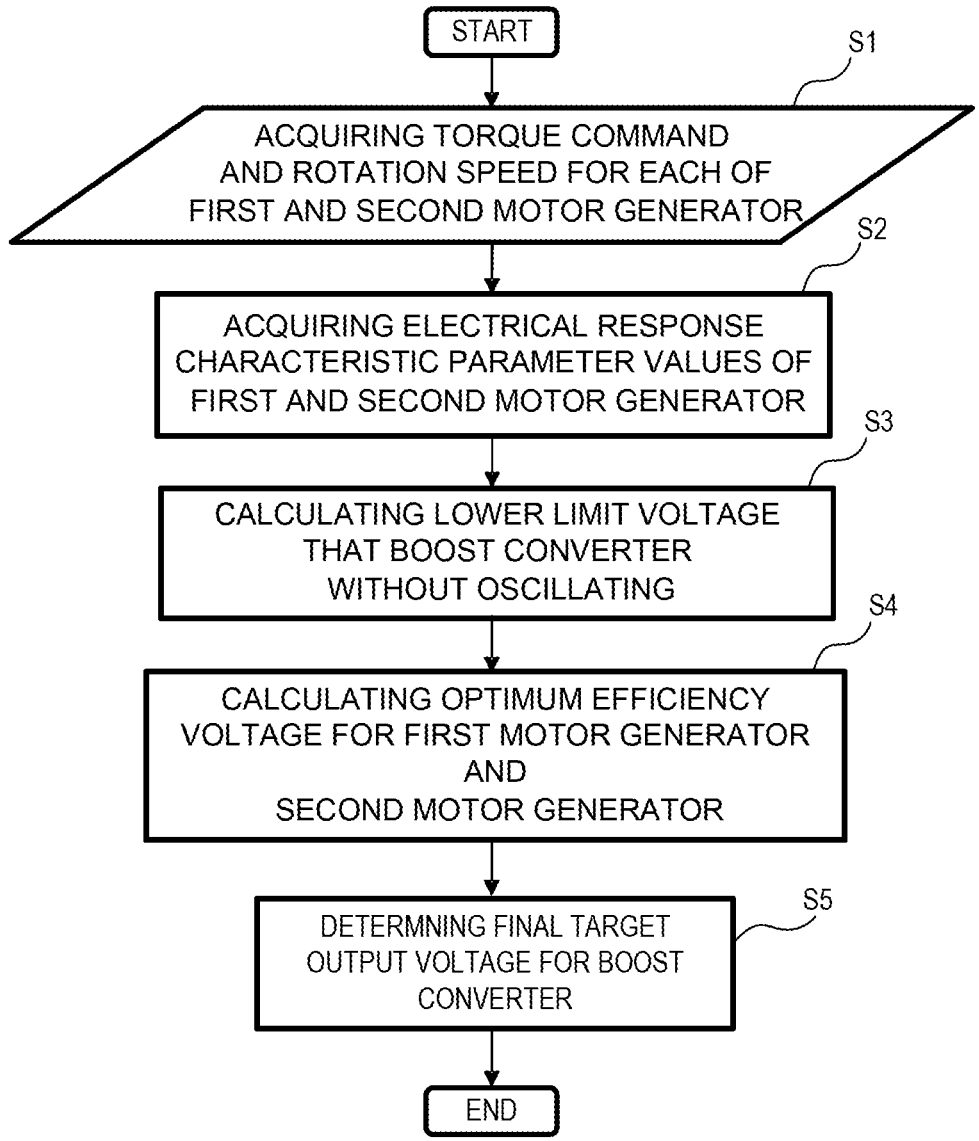
FIG. 6 is a flowchart showing a setting process of the target output voltage V2*.

FIG. 6 is a flowchart showing a target output voltage V2* setting process of the boost converter 20 executed by the control device 90 of the present embodiment. The flowchart described below is programmed in the control device 90 so as to be constantly executed at regular intervals while the vehicle system is activated.

In step S1, the control device 90 acquires the torque command for each of the first motor generator 50 and the second motor generator 60, and acquires the rotation speed for each of the first motor generator 50 and the second motor generator 60.

In step S2, the control device 90 acquires the electrical response characteristic parameter values of the first motor generator 50 and the second motor generator 60. An electrical response characteristic parameter value is an index showing the current response characteristic of the motor generator and includes information on the oscillation frequency of the motor generator. The electrical response characteristic parameter value in this embodiment is acquired from a map in which the relationship between the operation point and the current response characteristic is stored according to the operation point of the motor generator determined from the torque command value acquired in step S1.

In step S3, the control device 90 sets the lower limit voltage $V2_C$ for stable supply of the output voltage V2 of the boost converter 20 without oscillating. The method of setting the lower limit voltage $V2_C$ in the present embodiment differs depending on the following two conditions. The two conditions are (a) a case where an unknown parameter is included in the response characteristics of the electrical current flowing into the inverter, and (b) a case where the response characteristics of the electrical current flowing into the inverter are known. In the present embodiment, the case where the response characteristic of the electrical current is unknown is a case where the response characteristic cannot be described by the formula (6). The case where the response characteristic of the electrical current is known is a case where the response characteristic can be described by the formula (6).

First, in the case (a) of the above, that is, in the case where the response characteristic of the electrical current flowing into the inverter cannot be described by the formula (6) because an unknown parameter is included, the setting method of the lower limit voltage $V2_C$ will be described.

Figure 7:
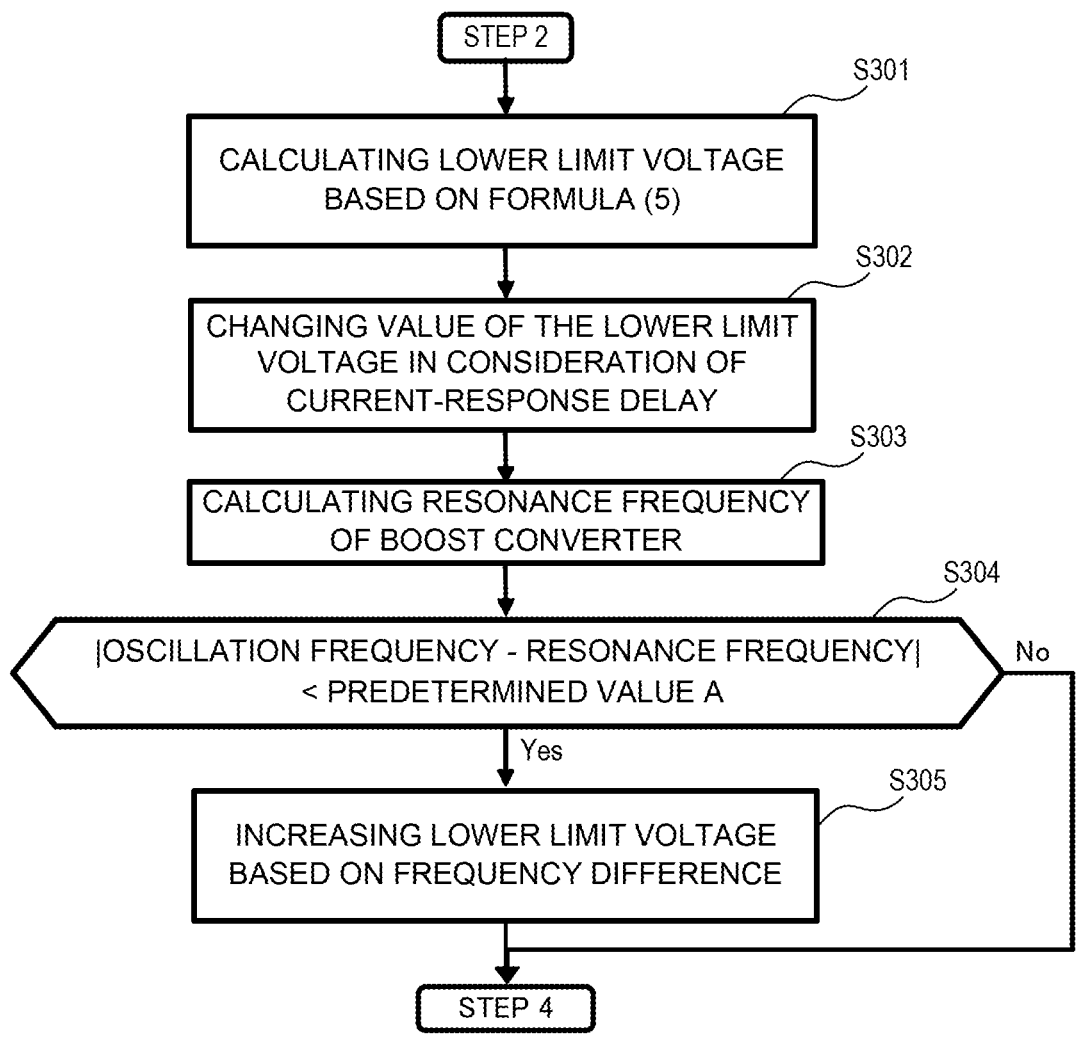
FIG. 7 is a flowchart showing a setting process of the lower limit voltage $V2_C$ in the case of the condition (a).

FIG. 7 is a flowchart showing the lower limit voltage $V2_C$ setting process executed in step S3 under the condition (a).

In step S301, the control device 90 calculates the lower limit voltage $V2_{C0}$ based on the right side of the above formula (5). Thus, the lower limit voltage $V_{2C}$ is calculated so that the output voltage V2 does not oscillate without considering the response characteristic of the electrical current flowing into the inverter. At this time, as the formula (5) shows, the lower limit voltage $V2_{C0}$ increases as the required output P1+P2 to the boost converter 20 increases. As a general rule, the larger the output of the motor generator, the easier the output voltage of boost converter 20 will be to oscillate. Therefore, by increasing the output voltage V2 as the output of the motor generator, that is, the required output P1+P2 increases, it is possible to suppress the increase of the oscillate with respect to the output voltage V2.

In step S302, the control device 90 changes the value of the lower limit voltage $V2_{C0}$ in consideration of the current-response delay of the motor generator. The current-response delay of the motor generator affects the stability of the boost converter system including the boost converter 20, the motor generator and the inverter. Therefore, the stability and efficiency of the boost converter system can be made compatible by changing the value of the lower limit voltage V2 according to the current-response delay of the motor generator.

How to change the lower limit voltage V2 depends on whether the required electric power P1+P2 is positive or negative. Specifically, when required electric power P1+P2 is positive, that is, when the electric power is supplied from the boost converter 20 to the load-side (the first inverter 30 and the second inverter 40) (when the electric power is extracted from the boost converter 20), the control device 90 calculates the lower limit voltage $V2_{C1}$ that becomes larger as the current-response delay becomes smaller with respect to the lower limit voltage $V2_{C0}$. When the required electric power P1+P2 is positive, the stability of the boost converter system decreases mainly due to the negative resistance characteristic by the constant power control of the inverter. The influence of the negative resistance characteristic is more pronounced as the current-response delay of the motor generator is smaller. Therefore, by setting the lower limit voltage V2 to be larger as the current-response delay is smaller, it is possible to suppress the output voltage V2 from oscillating.

On the other hand, when the required electric power P1+P2 is negative, that is, when the electric power is supplied from the load-side (the first inverter 30 and the second inverter 40) to the boost converter 20, the lower limit voltage $V2_{C1}$ is calculated such that the larger the current-response delay, the larger the lower limit voltage $V2_{C0}$. When the required electric power P1+P2 is negative, the stability of the boost converter system decreases as the current-response delay of the motor generator increases. Therefore, it is possible to suppress the output voltage V2 from oscillating by setting the lower limit voltage V2 to be larger as the current-response delay is larger. However, in the following description, it is assumed that required electric power P1+P2 is positive. The lower limit voltage $V2_{C1}$ is calculated by adding a lower limit voltage corrected value A as shown in FIG. 8 to the lower limit voltage $V2_{C0}$ calculated in step S301.

Figure 8:
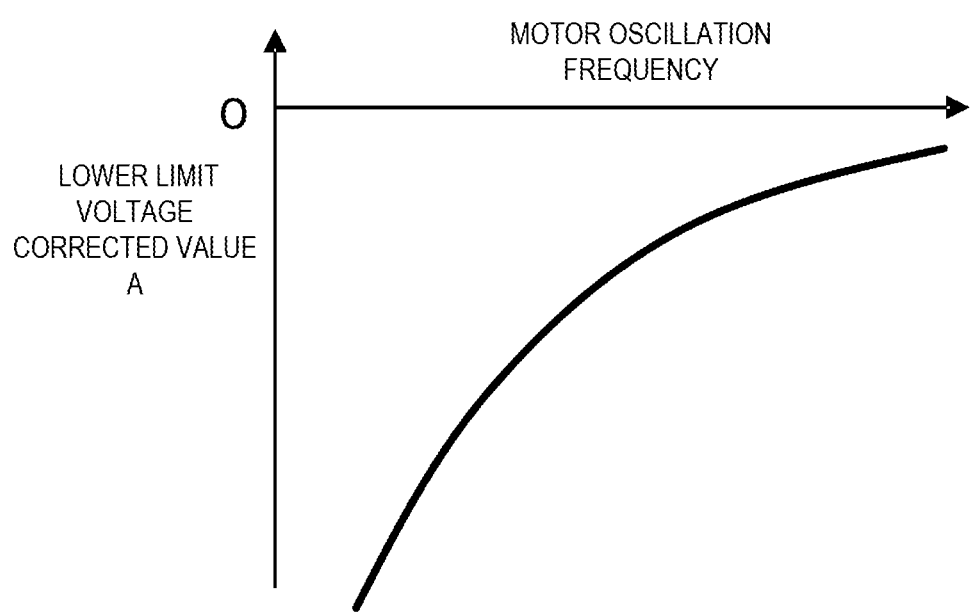
FIG. 8 is a diagram showing the relationship between the corrected lower limit voltage value A and the oscillation frequency of the motor generator.

FIG. 8 is a diagram showing the relationship between the lower limit voltage corrected value A and the oscillation frequency of the motor generator when the required electric power P1+P2 is positive. As shown in the figure, the lower limit voltage corrected value A is a negative value, and as the oscillation frequency of the motor generator becomes smaller, the lower limit voltage corrected value A has a large value on the negative side. The current-response delay becomes larger as the oscillation frequency of the motor generator becomes smaller. That is, the lower limit voltage $V2_{C1}$ when the required electric power P1+P2 is set to a value smaller than the lower limit voltage $V2_{C0}$ as the current-response delay becomes larger.

In step S303, the control device 90 calculates the resonance frequency fc of the boost converter 20. The resonance frequency fc is calculated below using the following formula (8).

[Expression 8]

$$f_c = \frac{D}{2\pi\sqrt{LC}} \quad (8)$$

Where, L in the formula (8) is the inductance [H] of the reactor 3, C is the capacity [F] of the capacitor 7, and D is the duty ratio for turning on the switching element 4a. The reciprocal of D is the boost ratio of boost converter 20.

At step S304, the control device 90 compares the resonance frequency fc of the boost converter 20 obtained at step S303 with the oscillation frequency of the motor generator obtained at step S2 of FIG. 6, and the control device 90 determines whether the absolute value of the difference (hereinafter referred to as "frequency difference") is smaller than the predetermined value A. The predetermined value A is determined in advance by experiments or the like from the viewpoint of whether the lower limit voltage $V2_C$ calculated based on the comparison result with the predetermined value A can substantially suppress the oscillation of the output voltage V2. The predetermined value A in this embodiment is set to 50 Hz, for example. When the absolute value of the frequency difference is smaller than the predetermined value A, the process of the following step 305 is performed. When the frequency difference is greater than or equal to the predetermined value A, the lower limit voltage $V2_{C1}$ calculated in step S302 is set as the lower limit voltage $V2_C$, the process of step S3 is ended, and the process of step S4 is performed (see FIG. 6).

Figure 9:
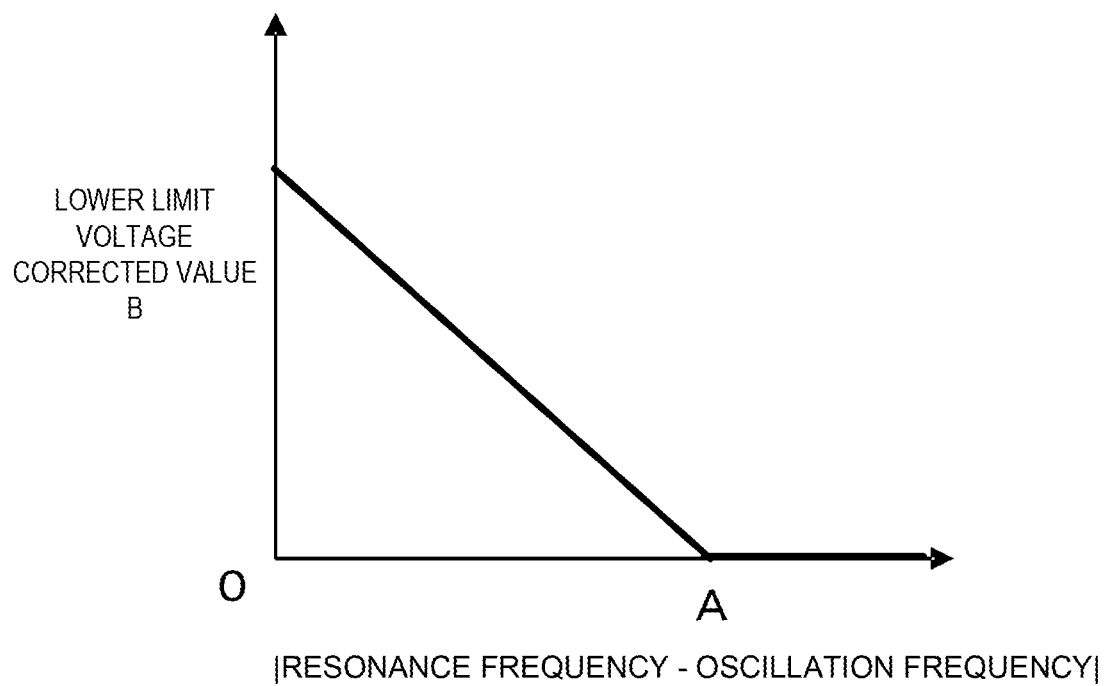
FIG. 9 is a diagram showing the relationship between the corrected lower limit voltage value B and frequency difference.

In step S305, the lower limit voltage $V2_{C1}$ is increased based on the frequency difference acquired in step S304. Specifically, the control device 90 calculates the lower limit voltage $V2_C$ that has a larger value as the frequency difference is smaller with respect to the lower limit voltage $V2_{C1}$. The lower limit voltage $V2_C$ calculated in this step is calculated by adding the lower limit voltage corrected value B as shown in FIG. 9 to the lower limit voltage $V2_{C1}$ calculated in step S302. In other words, in this step, the lower limit voltage V2 is corrected by the lower limit voltage corrected value B calculated based on the frequency difference.

FIG. 9 is a diagram showing the relationship between the lower limit voltage corrected value B and the frequency difference. As illustrated, the lower limit voltage corrected value B shows a positive value in a region where the frequency difference is smaller than the predetermined value A, and becomes larger as the frequency difference decreases toward 0. That is, in this step, the lower limit voltage $V2_{C1}$ calculated in step S302 is added with the lower limit voltage corrected value B that is larger as the frequency difference is smaller, whereby the lower limit voltage $V2_C$ is calculated.

Here, as a result of adding the voltage in step S305, the frequency difference becomes smaller, and it may be necessary to add the voltage. More specifically, when the lower limit voltage $V2_C$ becomes a larger value by adding the lower limit voltage corrected value B and the duty ratio D is set to a smaller value in order to increase the output voltage V2, and accordingly, the frequency difference between the resonance frequency fc and the oscillation frequency of the motor generator may become further smaller. In this case, it is necessary to add the lower limit voltage corrected value B corresponding to the smaller frequency difference (see FIG. 9) and reset the lower limit voltage $V2_C$ to a larger value.

Therefore, in the present embodiment, the process in step S305 may be performed as follows. That is, when the frequency difference after adding the lower limit voltage corrected value B (see FIG. 9) calculated based on the frequency difference acquired in step S304 is smaller than the value before the addition, the process corresponding the following two conditions may be performed. The two conditions are that (c) the frequency difference becomes smaller and the resonance frequency fc of the boost converter 20 is larger than the oscillation frequency of the motor generator (the resonance frequency fc>the oscillation frequency), and (d) the frequency difference becomes smaller and the resonance frequency fc of the boost converter 20 is smaller than the oscillation frequency of the motor generator (the resonance frequency fc<the oscillation frequency).

In the case of (c) described above, the control device 90 adds the lower limit voltage corrected value B (see FIG. 9) when the frequency difference is zero to the lower limit voltage V2ci calculated in step S302. In the case of (d) described above, the control device 90 adds a value to the lower limit voltage V2ci calculated in step S302. The lower limit voltage corrected value B based on the frequency difference after adding the lower limit voltage corrected value B is used as the value instead of the lower limit voltage corrected value B based on the frequency difference before adding the lower limit voltage corrected value B. By performing processing in this way, it is possible to immediately set the lower limit voltage V2c at which the output voltage V2 does not oscillate. Therefore, the calculation time of the lower limit voltage V2c can be shortened.

The above is the details of the setting method of the lower limit voltage $V2_C$ in the case of the condition (a) in step S3 of FIG. 6, that is, when the response characteristic of the electrical current flowing into the inverter includes an unknown parameter. Hereinafter, with reference to FIG. 10, a method of setting the lower limit voltage $V2_C$ will be described in the case of the condition (b) in step 3 of FIG. 6, that is, when the response characteristic of the electrical current flowing into the inverter includes known parameter.

Figure 10:
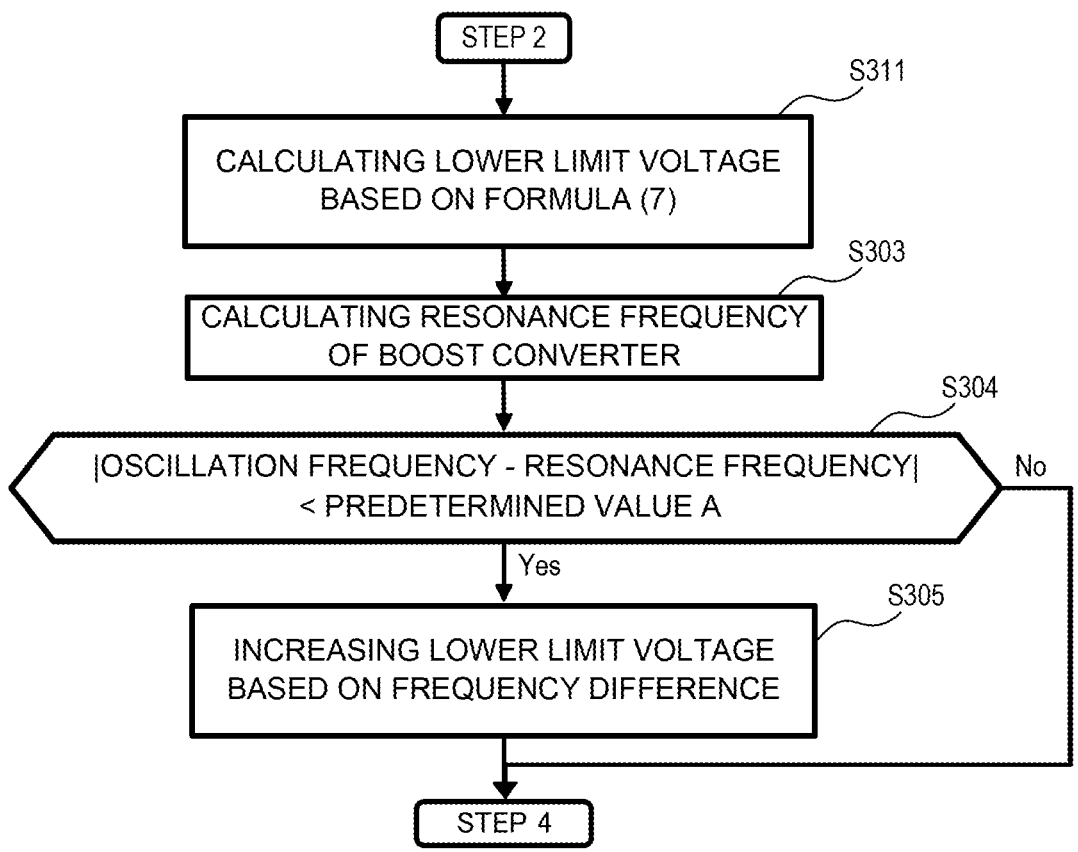
FIG. 10 is a flowchart showing a setting process of the lower limit voltage $V2_C$ in the case of the condition (b).

FIG. 10 is a flowchart showing the lower limit voltage $V2_C$ setting process executed in step S3 in the case of the condition (b). The same steps as those in the flowchart shown in FIG. 7 are designated by the same step numbers, and description thereof will be omitted.

In step S311, the control device 90 calculates the lower limit voltage $V2_{C0}$ based on the above formula (6) and formula (7). Specifically, when the response characteristic of the electrical current flowing into the inverter when the output voltage V2 of the boost converter 20 is applied to the inverter can be described by the formula (6), the control device 90 calculates the lower limit voltage $V2_C$ of the output voltage V2 such that the transfer characteristic (the formula (7)) from the input voltage V1 to the output voltage V2 becomes stable. In addition, the control device 90 can also acquires, in advance, a map associated with the damping coefficient ζ2 indicated by the formula (6), the natural oscillation frequency f2, the input voltage V1 of the boost converter 20, and the required electric power P1+P2 to the boost converter 20, with the lower limit voltage $V2_C$ at which the output voltage V2 becomes stable. Then, the control device 90 can calculate the lower limit voltage $V2_C$ by referring to above map according to the operation point of the motor generator.

In subsequent steps S304 to S305, control device 90 executes the same processing as the processing having the same step number in FIG. 6 and sets lower limit voltage $V2_C$. As described above, when the current response characteristic is known, the lower limit voltage $V2_C$ in which the current response characteristic is taken into consideration can be calculated immediately.

As described above, the lower limit voltage $V2_C$ calculated by the flow shown in FIG. 7 and FIG. 10 has the following values. That is, the lower limit voltage $V2_C$ has a larger value as the required electric power P1+P2 to the boost converter 20 becomes larger. Also, when the required electric power P1+P2 is positive, the lower limit voltage $V2_C$ becomes smaller as the response delay of the electrical current flowing into the inverter becomes larger. Also, when the required electric power P1+P2 is negative, the lower limit voltage $V2_C$ becomes larger as the response delay of the electrical current flowing into the inverter becomes larger. Further, the lower limit voltage $V2_C$ has a larger value as the difference (the frequency difference) between the resonance frequency fc of the boost converter 20 and the oscillation frequency of the motor generator is smaller. In addition, a value obtained by adding, for example, a 10% margin to the lower limit voltage $V2_C$ may be set as the final lower limit voltage $V2_C$ in consideration of variations in the calculated value and the detected value accompanying the calculation. When the lower limit voltage $V2_C$ is set, the controller 90 subsequently executes the process of step S4 shown in FIG. 6. Hereinafter, returning to FIG. 6, the description will be continued.

In step S4, the control device 90 calculates the first optimum efficiency voltage $V2_{-m1}$ and the second optimum efficiency voltage $V2_{-m2}$. More specifically, the control device 90 calculates the first optimum efficiency voltage $V2_{-m1}$ for the first motor generator 50 from the torque command for the first motor generator 50 and the motor rotation speed of the first motor generator 50, and the controller 90 calculates the second optimum efficiency voltage $V2_{-m2}$ for the second motor generator 60 from the torque command for the second motor generator 60 and the motor rotation speed of the second motor generator 60.

In step S5, the control device 90 selects the largest voltage value from the three voltage values of the lower limit voltage $V2_C$ obtained in step S3, the first optimum efficiency voltage $V2_{-m1}$ obtained in step S4, and the second optimum efficiency voltage $V2_{m2}$, and the control device 90 sets the selected voltage value to the target output voltage V2* (the target output voltage command value V2*). This allows the boost converter 20 to output the output voltage V2 satisfying the required electric power P1+P2 and suppressing the oscillation.

With reference to FIG. 11, an effect when the control method of the boost converter 20 of the present embodiment is applied will be described.

Figure 11A:
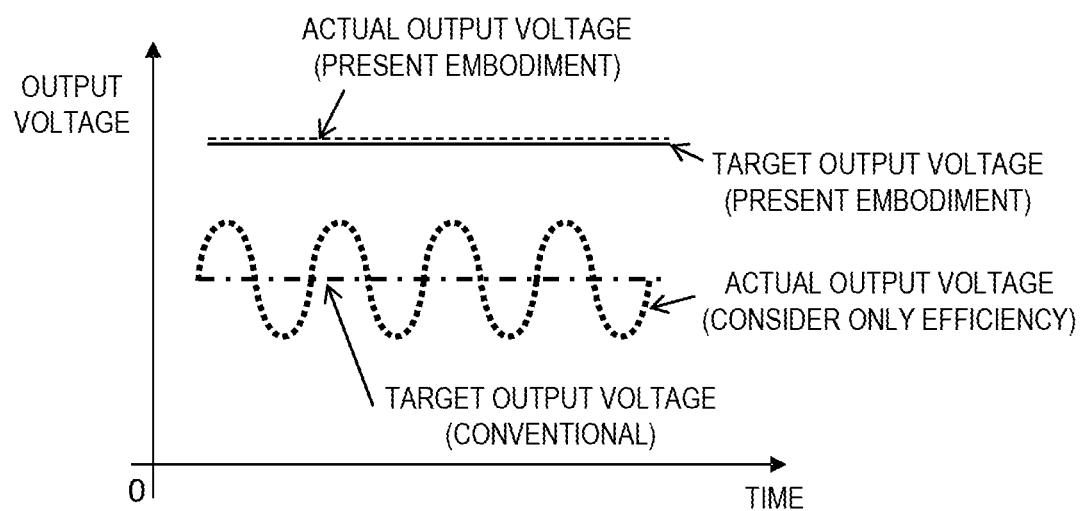
FIG. 11 is a diagram for explaining the effect of the control method of the boost converter in one embodiment.
Figure 11B:
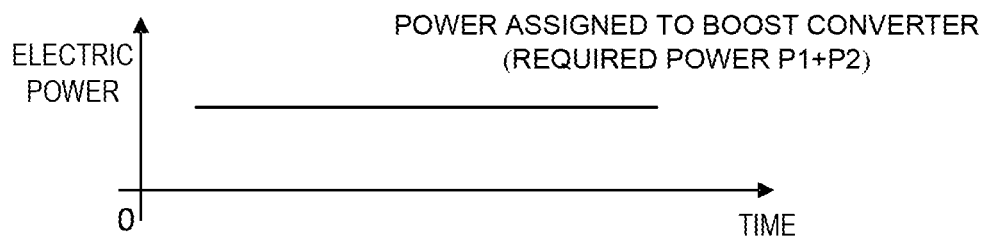

FIG. 11 is a time chart explaining the behavior of the output voltage V2 when the control method of the boost converter 20 of this embodiment is applied. FIG. 11A shows the output voltage of the boost converter 20, and FIG. 11B shows the required electric power P1+P2 assigned to the boost converter 20. In both figures, the horizontal axis represents time.

As shown in the figure, the required electric power P1+P2 shows a constant positive value, and the vehicle is in power running. At this time, when the target output voltage to the boost converter 20 is calculated according to the required electric power P1+P2, if only the efficiency is taken into consideration as in the conventional case, the target output voltage shown by the one-dot chain line in FIG. 11A is calculated. As a result, the actual output voltage output according to the target output voltage considering only the efficiency becomes oscillation tendency as shown by the dotted line in the figure.

On the other hand, according to the control apparatus of the boost converter 20 of the present embodiment, the target output voltage (the first optimum efficiency voltage $V2_{\_m1}$ and the second optimum efficiency voltage $V2_{\_m2}$) considering only the efficiency is calculated as in the conventional case, and calculated the lower limit voltage $V2_C$ such that the actual output voltage does not oscillate. Then, the highest voltage value is set as the target output voltage V2* by the select-high of these voltage values. As shown in the figure, the lower limit voltage $V2_C$ calculated by the control method of the boost converter 20 according to the present embodiment is larger than the target output voltage calculated by considering only the efficiency as in the conventional case. Therefore, according to this embodiment, the lower limit voltage $V2_C$ is selected by the select-high, and the lower limit voltage $V2_C$ is set as the target output voltage V2*. As a result, it is possible to significantly suppress the actual output voltage of the boost converter 20 from becoming an oscillation tendency as compared with the conventional case.

As described above, the control method of the boost converter 20 according to the present embodiment is the control method of the boost converter 20 comprises boosting the voltage input from the electric power supply and suppling the boosted voltage to the load-side. The control method of the boost converter 20 comprises securing the output electric power (the required electric power P1+P2) required according to the operation point of the motor (the first motor generator 50 and the second motor generator 60) connected to the load-side, calculating the lower limit voltage value (the lower limit voltage $V2_C$) at which the output voltage V2 of the boost converter 20 does not oscillate, setting the target output voltage V2* of the boost converter 20 to a value equal to or higher than the lower limit voltage $V2_C$, and controlling the boost converter so as to output a voltage according to the target output voltage. This can prevent the output voltage V2 of the boost converter 20 from becoming an oscillation tendency. As a result, it is possible to prevent the occurrence of overvoltage, overcurrent, and torque oscillation of the motor generator due to the output voltage V2 oscillating.

Further, according to the control apparatus of the boost converter 20 of one embodiment, the lower limit voltage $V2_C$ is set to a larger value as the output electric power (the request output P1+P2) of the motor generator is larger. For this reason, the output voltage V2 is set to a larger value as the output P1+P2 is larger, so that it is possible to prevent the oscillation from increasing with respect to the output voltage V2. As a result, it is possible to prevent the occurrence of overvoltage, overcurrent, and torque oscillation of the motor generator due to the output voltage V2 oscillating.

Further, according to the control method of the boost converter 20 of one embodiment, the lower limit voltage $V2_C$ is changed according to the value of the current-response delay of the motor generator. This makes it possible to achieve both stability and efficiency of the boost converter system.

Further, according to the control method of the boost converter 20 of one embodiment, when the electric power is supplied from the boost converter 20 to the load-side (the first inverter 30 and the second inverter 40), the lower limit voltage $V2_C$ is set to a larger value as the current-response delay of the motor generator is smaller. As a result, the influence of the negative resistance characteristic due to the constant power control of the inverter can be reduced, so that the output voltage V2 can be suppressed from oscillating.

Further, according to the control method of the boost converter 20 of one embodiment, when electric power is supplied to the boost converter 20 from the load-side (the first inverter 30 and the second inverter 40), the lower limit voltage $V2_C$ is set to a larger value as the current-response delay of the motor generator is larger. This can prevent the output voltage V2 from oscillating.

Further, according to the control method of the boost converter 20 of one embodiment, the lower limit voltage V2 is corrected by adding a correction value (the lower limit voltage corrected value B) that is calculated to become larger as the frequency difference between the resonance frequency of the boost converter 20 and the oscillation frequency of the motor generator becomes smaller. As a result, the output voltage of the boost converter 20 increases and the stability can be improved, so that the oscillation of the output voltage V2 is further suppressed.

Further, according to the control method of the boost converter 20 of one embodiment, the correction value (the lower limit voltage corrected value B) is set as a value calculated when the frequency difference is 0, in the case where, after corrected, the frequency difference becomes smaller than the frequency difference before correction and the resonance frequency fc of the boost converter 20 is larger than the oscillation frequency of the motor generator. As a result, the calculation time can be shortened and the target output voltage V2* at which the output voltage does not oscillate can be calculated faster.

Further, according to the control method of the boost converter 20 of one embodiment, the correction value (the lower limit voltage corrected value B) is set as a correction value (the lower limit voltage corrected value B) calculated based on the frequency difference after correction instead of a value adding a correction value (the lower limit voltage corrected value B) calculated based on the frequency difference before correction, in the case where, after corrected, the frequency difference is smaller than the frequency difference before correction and the resonance frequency fc of boost converter 20 is smaller than the oscillation frequency of the motor generator. As a result, the calculation time can be shortened and the target output voltage V2* where the output voltage does not oscillate can be calculated faster.

Further, the control method of the boost converter 20 of one embodiment comprises securing the output electric power (the required electric power P1, P2) required according to the operation point of the motor generator, calculating the optimum efficiency voltage value (the first optimum efficiency voltage $V2_{\_m1}$ and second optimum efficiency voltage $V2_{\_m2}$) for driving the motor generator most efficiently, and setting the larger voltage value of the lower limit voltage $V2_C$ and the optimum efficiency voltage value to the target output voltage V2*. Thereby, especially when the optimum efficiency voltage value is larger than the lower limit voltage $V2_C$, it is possible to suppress oscillation and output the output voltage V2 that can most efficiently drive the motor generator to the boost converter 20.

The present invention is not limited to the embodiments described above, it is possible to various modifications and applications.

For example, although it has been described that the vehicle to which the control method of the boost converter 20 of the present embodiment is applied is the series system hybrid vehicle, it is not necessarily limited to this case. The control method of the boost converter 20 according to the present invention can be appropriately applied to any boost converter system in which at least one set of an inverter and a motor are connected to the load-side of the boost converter 20.

The invention claimed is:

1. A boost converter control method boosting a voltage input from a power supply and supplying a boosted voltage to a motor generator connected to a load-side, the boost converter control method comprising:
   calculating a required electric power on the basis of a torque command for the motor generator and a rotation speed of the motor generator,
   calculating, on the basis of the required electric power, a lower limit voltage value at which an output voltage of a boost converter does not oscillate,
   setting a target output voltage of the boost converter to a value equal to or higher than the lower limit voltage value, and
   controlling the boost converter so as to output a voltage according to the target output voltage.

2. The boost converter control method according to claim 1, wherein
   the lower limit voltage value is set to a larger value as the required electric power of the motor generator is larger.

3. The boost converter control method according to claim 1, wherein
   the lower limit voltage value is changed according to a value of a current-response delay of the motor generator.

4. The boost converter control method according to claim 3, wherein
   the lower limit voltage value is set to a larger value as the current-response delay of the motor generator is smaller, when electric power is supplied from the boost converter to the load-side.

5. The boost converter control method according to claim 3, wherein
   the lower limit voltage value is set to a larger value as the current-response delay of the motor generator is larger, when electric power is supplied to the boost converter from the load-side.

6. The boost converter control method according to claim 1, wherein
   the lower limit voltage value is corrected by adding a correction value, the correction value is calculated to become larger as a frequency difference between a resonance frequency of the boost converter and an oscillation frequency of the motor generator becomes smaller.

7. The boost converter control method according to claim 6, wherein
   the correction value is set as a value calculated when the frequency difference is 0, in the case where, after corrected, the frequency difference becomes smaller than the frequency difference before correction and the resonance frequency of the boost converter is larger than the oscillation frequency of the motor generator.

8. The boost converter control method according to claim 6, wherein
   the correction value is set as a correction value calculated based on the frequency difference after correction instead of a correction value calculated based on the frequency difference before correction, in the case where, after corrected, the frequency difference is smaller than the frequency difference before correction and the resonance frequency of the boost converter is smaller than the oscillation frequency of the motor generator.

9. The boost converter control method according to claim 1, wherein
   securing an output electric power required according to an operation point of a motor generator connected to the load-side,
   calculating an optimum efficiency voltage value for driving the motor generator most efficiently, and
   setting a larger voltage value of the lower limit voltage value and the optimum efficiency voltage value to the target output voltage.

10. A boost converter control apparatus comprising a boost converter configured to boost a voltage input from a power supply and supplying a boosted voltage to a motor generator connected to a load-side, and a controller configured to control the boost converter,
    wherein the controller is further configured
    to calculate a required electric power on the basis of a torque command for the motor generator and a rotation speed of the motor generator,
    to calculate, on the basis of the required electric power, a lower limit voltage value at which an output voltage of the boost converter does not oscillate,
    to set a target output voltage of the boost converter to a value equal to or higher than the lower limit voltage value, and
    to control the boost converter so as to output a voltage according to the target output voltage.

* * * * *